(12) United States Patent
Donia (10) Patent No.: US 10,902,520 B2
(45) Date of Patent: **\*Jan. 26, 2021**

(54) AUTOMATED COMPLIANCE SCORING SYSTEM THAT ANALYZES NETWORK ACCESSIBLE DATA SOURCES

(71) Applicant: IDEALRATINGS, INC., San Francisco, CA (US)

(72) Inventor: Mohamed Donia, San Francisco, CA (US)

(73) Assignee: IDEALRATINGS, INC., San Francisco, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/384,065

(22) Filed: Apr. 15, 2019

(65) Prior Publication Data

US 2019/0244296 A1  Aug. 8, 2019

Related U.S. Application Data

(63) Continuation of application No. 15/425,288, filed on Feb. 6, 2017, now Pat. No. 10,262,371.

(51) Int. Cl.
*G06Q 40/06* (2012.01)
*G06Q 30/00* (2012.01)
*G06Q 30/02* (2012.01)

(52) U.S. Cl.
CPC ........... *G06Q 40/06* (2013.01); *G06Q 30/018* (2013.01); *G06Q 30/0279* (2013.01)

(58) Field of Classification Search
CPC .............................. G06Q 40/06; G06Q 30/018
(Continued)

(56) References Cited

U.S. PATENT DOCUMENTS

| 7,797,225 B1 * | 9/2010 | Kemp | G06Q 40/06 705/37 |
| 2002/0077949 A1 * | 6/2002 | Qasem | G06Q 40/02 705/36 R |

(Continued)

OTHER PUBLICATIONS

Islamic Aid, Islamic Aid Bank Interest Money Interest Money (Riba) can Help us Save Lives, article dated Feb. 23, 2015, pp. 1-3, Islamic Aid (a US 501 (c)(3) nonprofit organization), which is found at:/https:/www.Islamicaid.com/bank-Interest-money/. (Islamic Aid Article, 2015 ("IAA-2015") (Year: 2015).*

(Continued)

*Primary Examiner* — Benjamin S Brindley
(74) *Attorney, Agent, or Firm* — Arc IP Law, PC; Joseph J. Mayo (57) ABSTRACT

An automated system that analyzes network accessible data sources to determine a score that measures compliance of an investment with a compliance policy. The compliance policy may specify for example ESG (Environment, Social, or Governance) requirements, or prohibitions against selling of certain products and services considered undesirable or unethical by certain investors. Compliance analysis may determine the amount of revenue or income received from prohibited sources, or it may search information for key words and phrases related to these sources. The system may "purify" noncompliant investments by bundling them with charitable contributions that offset the income from prohibited sources. Fund managers may publish and share compliance policy definitions, and may import these shared definitions and customize them for their specific fund requirements.

20 Claims, 9 Drawing Sheets

(58) Field of Classification Search
USPC .................................................... 705/36 R
See application file for complete search history.

(56) References Cited

U.S. PATENT DOCUMENTS

| | | | | |
|---|---|---|---|---|
| 2004/0107152 | A1* | 6/2004 | Marlowe-Noren | G06Q 40/02 705/35 |
| 2004/0225589 | A1* | 11/2004 | Marlowe-Noren | G06Q 40/04 705/35 |
| 2007/0038551 | A1* | 2/2007 | Shah | G06Q 40/06 705/37 |
| 2007/0130060 | A1* | 6/2007 | Ariarajah | G06Q 40/06 705/38 |
| 2007/0255633 | A1* | 11/2007 | Kridel | G06Q 40/00 705/35 |
| 2008/0243711 | A1* | 10/2008 | Aymeloglu | G06Q 40/06 705/36 R |
| 2010/0010927 | A1* | 1/2010 | Melby | G06Q 40/06 705/37 |
| 2010/0030718 | A1* | 2/2010 | Anderson | G06F 21/6218 706/47 |
| 2010/0121759 | A1* | 5/2010 | Waelbroeck | G06Q 40/00 705/37 |
| 2011/0082814 | A1* | 4/2011 | Chiulli | G06Q 40/025 705/36 R |
| 2012/0296845 | A1* | 11/2012 | Andrews | G06Q 40/06 705/36 R |
| 2013/0179259 | A1* | 7/2013 | Lindauer | G06Q 30/02 705/14.52 |
| 2013/0204805 | A1* | 8/2013 | Caper | G06Q 40/06 705/36 R |
| 2014/0081842 | A1* | 3/2014 | Mahmood | G06Q 30/0279 705/39 |
| 2014/0279679 | A1* | 9/2014 | Marshall | G06Q 40/06 705/36 R |
| 2015/0221032 | A1* | 8/2015 | Rohlfs | G06Q 40/04 705/37 |
| 2015/0324919 | A1* | 11/2015 | Riggs | G06F 16/22 705/36 R |
| 2016/0012535 | A1* | 1/2016 | Phinney, Jr. | G06Q 40/06 705/36 R |

OTHER PUBLICATIONS

Islamic Aid Bank Interest Money, "Interest Money (Riba) can Help us Save Lives", retrieved on May 18, 2017 from https://www.islamicaid.com/bank-interest-money, 2 pages.

* cited by examiner

AUTOMATED COMPLIANCE SCORING SYSTEM THAT ANALYZES NETWORK ACCESSIBLE DATA SOURCES

This application is a continuation of U.S. Utility patent application Ser. No. 15/425,288 filed 6 Feb. 2017, issued as U.S. patent Ser. No. 10/262,371, the specification of which is hereby incorporated herein by reference.

BACKGROUND OF THE INVENTION

Field of the Invention

One or more embodiments of the invention are related to the field of data analysis systems. More particularly, but not by way of limitation, one or more embodiments of the invention enable a system that analyzes network accessible data sources to generate a compliance score for investments.

Description of the Related Art

Socially conscious investing attempts to understand a potential investment's (i.e., instrument's) adherence to the investor's principles of what constitutes "good" (typically as provided as documented standards by a fund manager or another intermediary). For example, some investors may define "good" investments as those that adhere to sound "ESG" (environmental, social, and governance) principles. "Good" environmental, social, and governance may require certain behaviors such as adherence to given ISO standards or ensuring independent outside board members, and may forbid other behaviors such as building or selling nuclear weapons (among, of course, many other actions). Another category of socially conscious investing is adherence to Shariah (Islamic) Law, which requires certain behaviors such as the giving of alms and forbids other behaviors such as consumption of alcohol or the lending or borrowing of money for simple or compound interest.

Screening or rating of investments for compliance with various categories of socially conscious investing has traditionally required extensive manual review and analysis of individual investments and of the organizations associated with these investments. For example, an analyst may conduct extensive interviews with the management of a company to determine whether the company complies with a fund's policies. This process is very time consuming, and it must be repeated frequently as companies change their products and services, update their business models, and change ownership through mergers and acquisitions. This manual review and analysis process significantly increases the expense and complexity of socially conscious investing. In addition, compliance assessments may be out of date or incomplete because of the difficulty of manually tracking all the necessary data. There are no known systems that provide an automated compliance scoring system that generates compliance scores to indicate the extent to which a set of investments complies with a specified compliance policy.

For at least the limitations described above there is a need for an automated compliance scoring system that analyzes network accessible data sources.

BRIEF SUMMARY OF THE INVENTION

One or more embodiments described in the specification are related to an automated compliance scoring system that analyzes network accessible data sources. Embodiments of the system transform a list of investments into compliance scores that indicate the extent to which the investments comply with a specified policy. The transformation may be based on analysis of data sources that may be for example accessible over a network such as the Internet or a private network.

One or more embodiments of the system may include or access an investment compliance policy definition. This definition may describe the objectives for the investment or for a fund that may incorporate multiple investments. The compliance policy definition may for example include a set of prohibited activities (such as doing business in North Korea, for example), or a set of required activities (such as including outside directors on the board of directors, for example). The system may include a compliance analyzer that calculates a compliance score for a list of investments, based on the compliance policy definition. The compliance analyzer may search one or more data sources, such as data sources accessible via a network, to locate information on the organizations associated with the investments. It may then analyze this information to obtain evidence of the extent to which each organization performs the prohibited activities or the required activities. Based on this evidence, the compliance analyzer may transform the list of investments into a corresponding set of compliance scores for each investment.

Prohibited activities may include for example, without limitation, one or more of selling of a prohibited product or service, doing business in a prohibited location or with a prohibited entity, polluting the environment, and borrowing or lending money for interest. Prohibited products or services may include for example, without limitation, one or more of alcohol, tobacco, firearms, weapons, and pornography. Required activities may include for example, without limitation, one or more of compliance with regulations, compliance with industry standards, enforcement of nondiscriminatory hiring policies, and inclusion of outside directors in a governance structure.

For one or more embodiments that measure compliance with a policy that prohibits or limits borrowing of money for interest, a compliance score may for example compare the amount of interest-bearing debt of an organization to one or more thresholds. A threshold may be based for example on a ratio of interest-bearing debt to one or more of the organization's assets, the organization's liquid assets (such as cash and receivables), and the organization's market capitalization (measured for example at a point in time, or over a period time such as for example a 12-month rolling average or a 36-month rolling average). One or more embodiments may have compliance policies that set maximum values for any or all of these thresholds for interest-bearing debt.

Data sources used for compliance analysis may include for example, without limitation, one or more of organization financial reports, filings with regulatory agencies, news feeds, product literature, and organization websites.

In one or more embodiments, analysis of the extent to which an organization performs prohibited activities may include, for example, calculating (or estimating) the percentage of revenue or percentage of income earned by the organization from the prohibited activities.

In one or more embodiments, analysis of the extent to which an organization performs prohibited or required activities may include, for example, searching data sources for words and phrases associated with the activities. These words and phrases may be included in a database that associates words and phrases with activities. In one or more embodiments, the database may include or reference a database of synonyms. In one or more embodiments, the database may include industry classification codes, such as for example SIC codes or NAICS codes.

In one or more embodiments, analysis of information may correlate the appearance of a word or phrase with the context in which it appears, such as for example a section or subsection title. In one or more embodiments, the compliance analyzer may crawl links in documents or web pages to find and analyze related information.

One or more embodiments may transform a noncompliant investment or set of investments into a "purified," compliant investment, for example by bundling one or more charitable contributions with the original investment or investments to form a compound financial instrument. For example, the compound instrument may make a charitable contribution that is equal to the amount of income generated by the original investment or investments from noncompliant sources such as prohibited products or services.

One or more embodiments may incorporate a compliance policy editor tool or tools that allow a fund manager or other investor to create, import, edit, modify, save, export, or share a compliance policy definition. Compliance policy definitions may be shared via a compliance policy definition database; thus, a fund manager may access and import compliance policy definitions generated by other fund managers, and may then customize them for the specific requirements of his or her fund.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An automated compliance scoring system that analyzes network accessible data sources will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
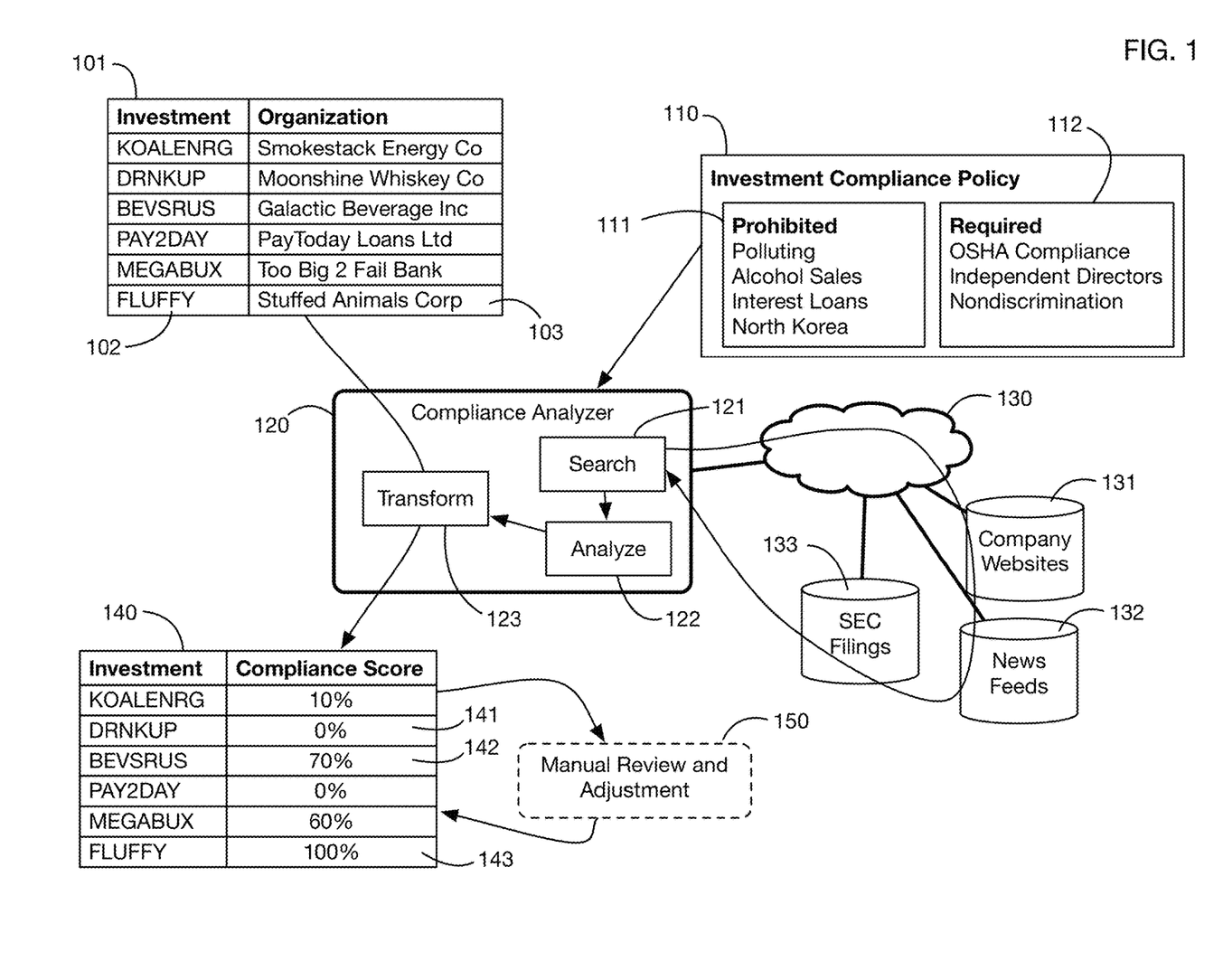
FIG. 1 shows an architectural block diagram of an embodiment of an automated compliance scoring system, illustrating an investment compliance policy definition, and a compliance analyzer that analyzes data sources to score investments based on compliance with the policy.

FIG. 1 shows an architectural diagram of an automated compliance scoring system. The system may include an investment compliance policy definition 110 that may define requirements for compliant investments. In general, in one or more embodiments the compliance policy definition 110 may include any type or types of requirements that determine whether an investment is compliant or the extent to which an investment is compliant. Compliance policies may be determined for example by fund managers, investment managers, wealth managers, or other organizations or persons who advise on investments or who make investments. These policies may be designed for example to screen potential investments for characteristics that may be considered desirable or essential by certain groups of investors. Compliance may be either binary (an investment is compliant or not) or a score or rating that indicates the degree to which an investment is compliant. A score may be for example, without limitation, a quantitative score (such as 80% out of 100% possible), or a categorical rating (such as AAA, AA, A, BBB, BB, B, C, etc.)

Compliance may be based for example on one or more prohibited activities or conditions 111, on one more required activities or conditions 112, or both. For example, without limitation, a compliance policy may specify one or more prohibited products or services, such as for example alcohol, tobacco, firearms, weapons, video games, or pornography; some investors may wish to avoid investing in organizations that provide these products or services because of moral, political, or religious beliefs. A compliance policy may specify for example that providing of loans for interest is prohibited; this policy may be important for example for selected Islamic investors since Shariah law typically prohibits fixed-income, interest-bearing bonds or similar instruments. A compliance policy may prohibit activities such as polluting or other environment damage. A compliance policy may prohibit operations in certain countries or territories, or business relations with specific countries or governments, for example if these countries, territories or governments are believed to be oppressive regimes or sponsors of terrorism. A compliance policy may prohibit bribery or other inducements or rewards for business, including those that may be legal but may be viewed as questionable on ethical grounds. A compliance policy may also require certain actions, behaviors, controls, or conditions. For example, without limitation, a compliance policy may require certain organizational governance procedures and policies, such as including a specified number or percentage of outside directors on a board of directors. A compliance policy may require that an organization comply with certain regulations (such as OSHA regulations for example.) A compliance policy may require that an organization meet or exceed certain targets, for example for safety or for use of recyclable materials. A compliance policy may require certain hiring or employment actions, such as for example hiring or promoting a certain percentage of specified groups. The above examples of compliance policy prohibitions and requirements are illustrative examples only; one or more embodiments may incorporate any desired conditions in compliance policies.

Using the compliance policy definition, a compliance analyzer 120 analyzes one or more sources of information to generate a compliance rating for one or more investments 101. The investments 101 may include any type or types of investment, including for example, without limitation, equity, bonds, preferred stock, options, private placements, loans, real estate, collectibles, any type of asset, mutual funds, exchange traded funds, REITs, and government bonds. Associated with each investment there may be one or more organizations, such as for example the company or entity that receives or manages the funds for the investment. For example, in the embodiment of FIG. 1, investment 102 may be an equity investment in organization 103. The organization may be any type of entity, including for example, without limitation, a company, a corporation, a partnership, a sole proprietorship, a limited liability company, a bank, a fund, a venture capital fund, a nonprofit organization, and a government. The compliance analyzer 120 may access one or more data sources to find information about the organizations and the investments 101. These data sources may be for example accessible over a network or networks 130, which may include for example the Internet, private networks, local networks, or any combinations thereof. The data sources may in some embodiments include proprietary data sources that are available to the organization that uses the compliance analyzer. Data sources may include for example, without limitation, company websites 131, news feeds 132, and filings 133 with regulatory agencies such as for example the SEC. Any type of public or private information source or database may be used as a data source for the compliance analyzer.

The compliance analyzer 120 may perform a search 121 of the data sources to locate information related to the investments and organizations 101. It may then perform analysis 122 of this information to determine the extent to which each organization or investment complies with the investment compliance policy 110. Based on this analysis, the compliance analyzer may perform transformation 123 that transforms the list of investments 101 into a list of associated compliance scores 140. The compliance scores may be any qualitative or quantitative measure of the degree to which an investment complies with the compliance policy definition 110. Illustrative examples shown in FIG. 1 include a 0% compliance score 141 for an investment that is completely noncompliant, a 70% compliance score 142 for an investment that is largely but not entirely compliant, and a 100% compliance score 143 for an investment that is fully compliant with the compliance policy 110. Instead of or in addition to percentage compliance scores, the compliance analyzer may categorize investments by their compliance or degree of compliance, for example by assigning categorical compliance scores such as Yes/No or AAA/AA/etc. In one or more embodiments, the system may provide capabilities for manual review and adjustment 150 of the system-generated compliance scores 140 or of any factor of factors that affect these scores. For example, an operator may be able to review the system-generated scores and the detailed information that contributed to these scores, and adjust the final scores if appropriate, or adjust any of the factors that affect the score calculations. In one or more embodiments, the compliance analyzer may generate a confidence rating for each compliance score, for example to alert an operator that a system-generated compliance score has significant uncertainty and should therefore be manually reviewed.

For one or more embodiments with compliance policies that prohibit sales of products or services in selected categories or sectors, the compliance analyzer may calculate or estimate the amount of revenue or income the investment generates from these prohibited products or services. The fraction of the investment's total revenue or income from non-prohibited products or services may be used as the compliance score for that investment, or may contribute to a calculation of a compliance score that includes other factors as well. One or more embodiments may use revenue, income, or both as the measure of compliance. One or more embodiments may use one or more proxies for revenue or income, such as for example the number of products, product lines, SKUs, stores, distributors, suppliers, or customers related to the prohibited products or services.

Figure 2:
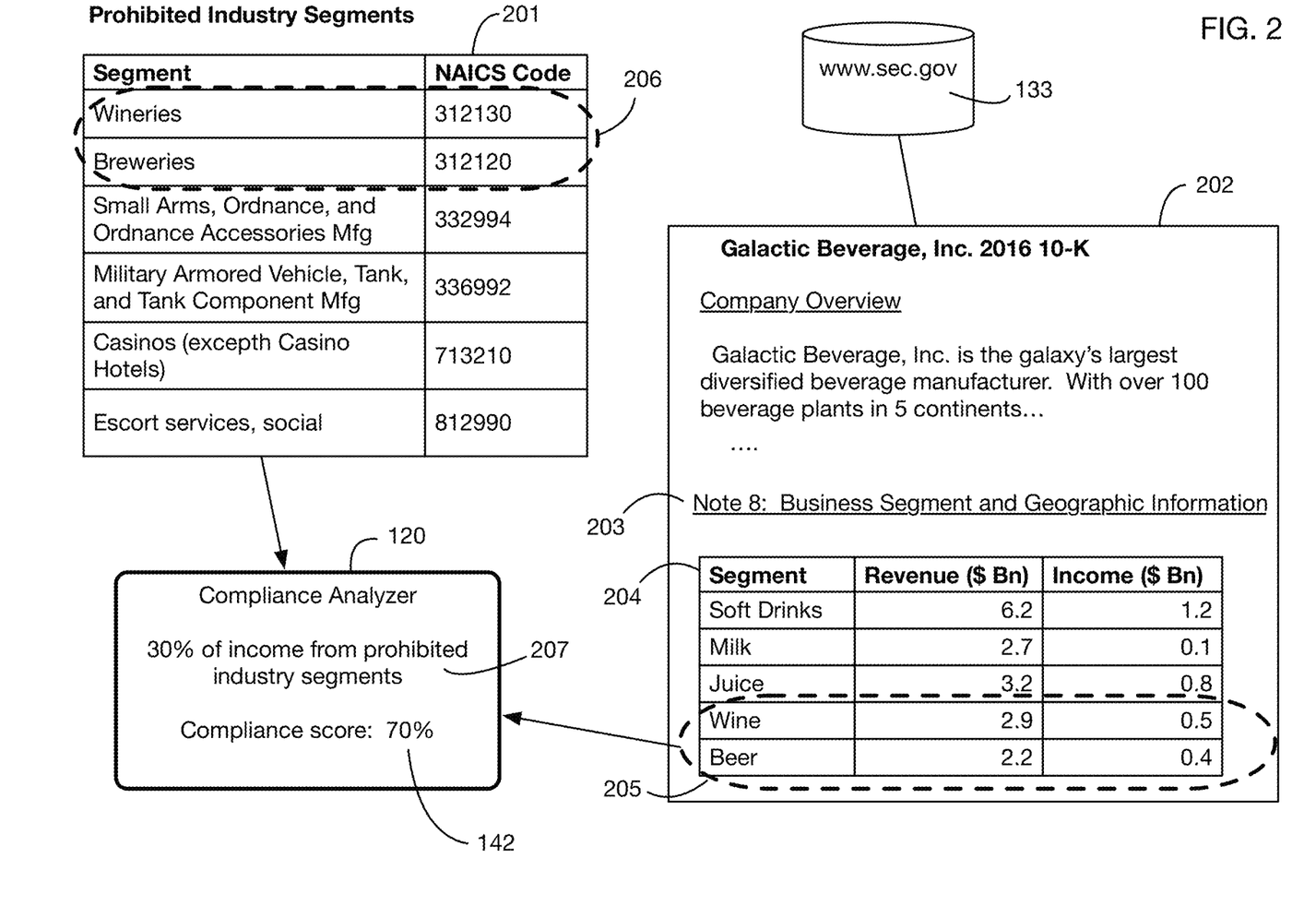
FIG. 2 illustrates an embodiment that analyzes the sources of revenue and income for an organization to determine compliance with a policy that prohibits selected products or services.

FIG. 2 illustrates an example with a compliance policy definition that prohibits products and services in 6 categories identified by table 201. These prohibited categories are identified in this example by segment NAICS codes. One or more embodiments may use any type of segment classification system, including for example, without limitation, SIC codes, NAICS codes, ISIC codes, GICS codes, ICB codes, or any other classification system. The compliance analyzer 120 searches and analyzes data sources including SEC filings 133 to determine how much revenue or income an organization derives from these prohibited segments. For example, the compliance analyzer may scan a 10-K such as 10-K 202, and may locate a section 203 in the 10-K that provides segment business information for the organization. In this example, table 204 in section 203 breaks down the company's revenue and income by industry segment. The compliance analyzer may match the description of the segment in table 204 with the table 201 of prohibited segments to determine whether a company-reported segment corresponds to any of the prohibited segments. In this example entries 205 in table 204 correspond to categories 206 in the prohibited segments list 201. Because the company reports revenue and income by segment, the compliance analyzer can calculate the percentage 207 of income received from the prohibited segments 206. In one or more embodiments, this amount may be estimated based on other information in the 10-K or in other data sources. In one or more embodiments, the compliance analyzer may base a compliance score on a revenue percentage instead of or in addition to an income percentage. The compliance analyzer determines the compliance score 142 for this business as the percentage of income from compliant sources, excluding the segments in table 201.

Figure 3:
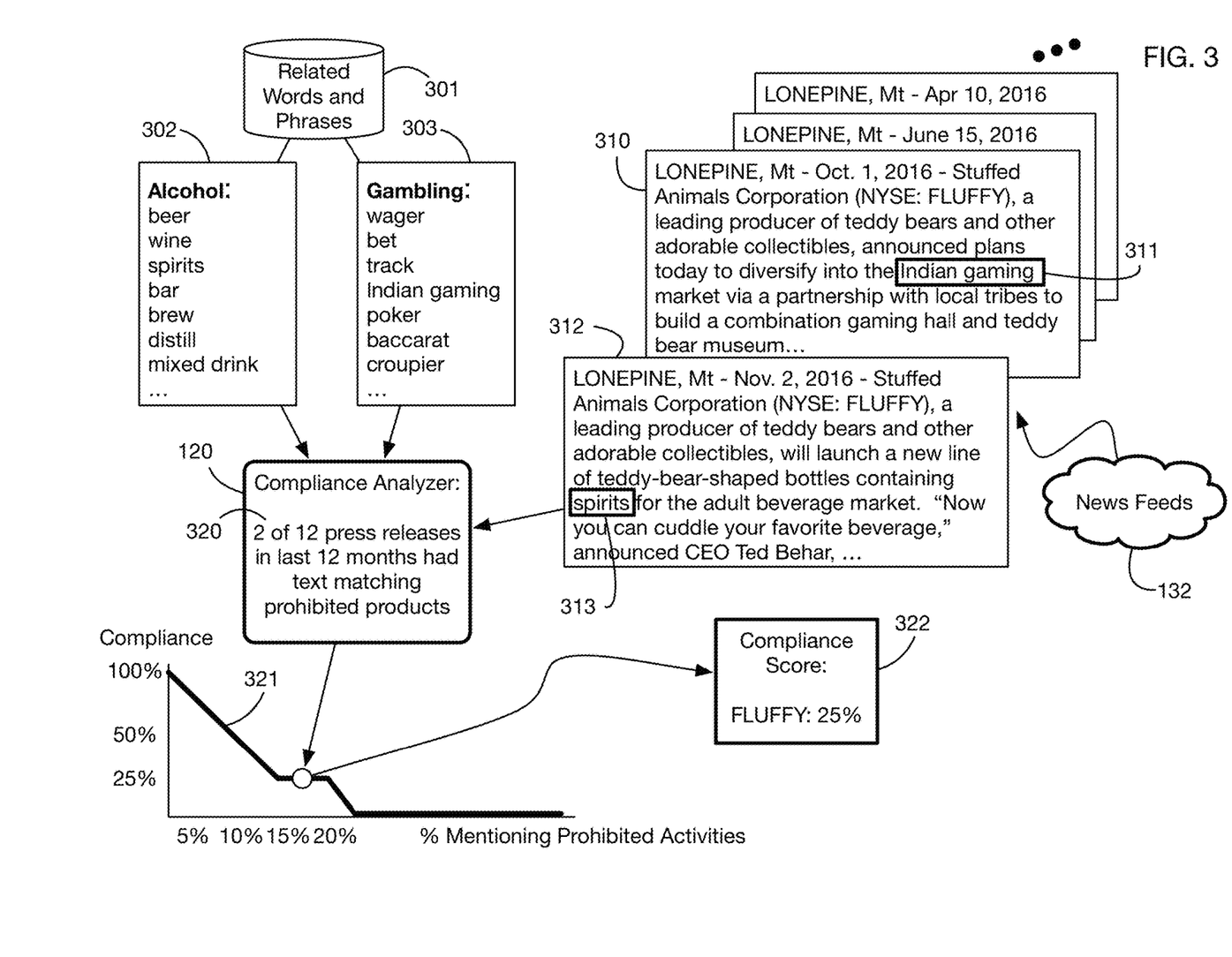
FIG. 3 illustrates an embodiment that scans news reports for words and phrases that are indicative of prohibited products or services.

In one or more embodiments, a compliance analyzer may obtain, analyze, or generate indicators of noncompliant activity in addition to or instead of revenue or income by segment. These indicators may for example be suggestive of noncompliant products or services, even if they do not provide quantitative, structured information on sales or income by segment. FIG. 3 illustrates an example that analyzes news feeds 132 for words and phrases that are related to or suggestive of prohibited products or services. The system may include a database 301 of words and phrases related to prohibited (or required) activities. For example, in the embodiment of FIG. 3, alcohol and gambling are prohibited products and services. Database 301 contains a list 302 of words and phrases related to alcohol, and a list 303 of words and phrases related to gambling. The example shown provides simple lists of related words and phrases; in one or more embodiments, this data may be more structured; for example, a relevance weight may be assigned to each word or phrase, or a parsing context may be provided for each word or phrase. The news feeds illustrated are press releases from the organization that the compliance analyzer is evaluating. In one or more embodiments, the compliance analyzer may analyze text (or graphics) in any information, including news from any source or any other type of information related to the organization or investment. Press release 310 contains phrase 311 that appears in list 303, and press release 312 contains word 313 that appears in list 302. The compliance analyzer 120 reviews all press releases from this organization over the last 12 months, and determines the percentage 320 of these press releases that contain text matching the prohibited products and services (2 of 12, approximately 17%). Although this percentage may be used directly as a compliance score (for example, by assigning a compliance score of 83% since approximately 83% of press releases do not mention prohibited products or services), in one or more embodiments the compliance analyzer may apply any desired function to transform data on occurrences of words and phrases into a compliance score. FIG. 3 illustrates an example transformation 321 that maps a percentage of mentions of prohibited activities into a compliance score. In this example, the curve 321 assigns a compliance score 322 of 25% to the organization based on the occurrence percentage of 17%. One or more embodiments may use any function to transform occurrence data into compliance scores.

Figure 4:
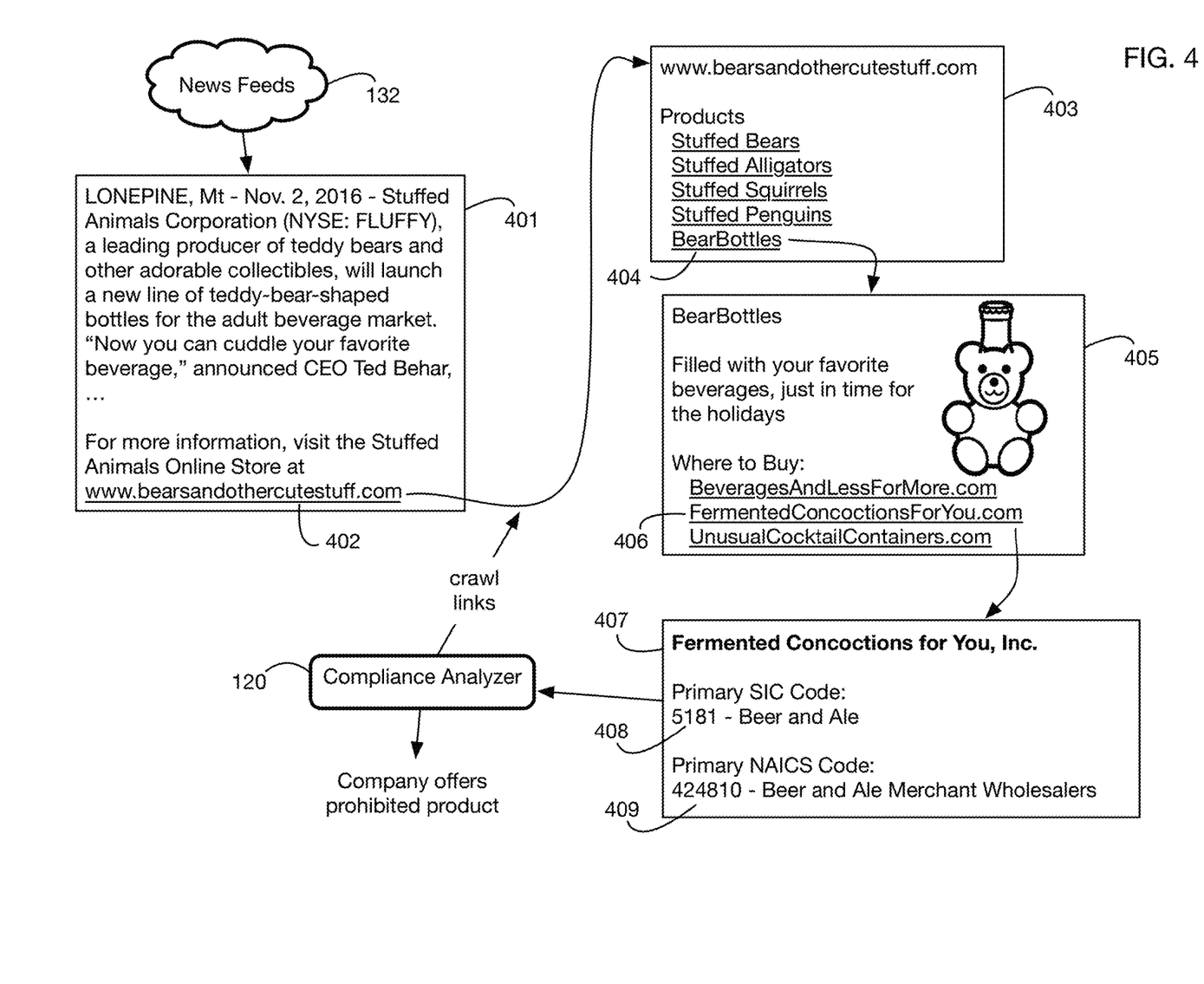
FIG. 4 shows an embodiment that crawls links in data sources to locate other information that may indicate compliance with a policy.

One or more embodiments may search for information on an investment or an organization by crawling links to obtain related information. FIG. 4 illustrates an example where compliance analyzer 120 initially analyzes a press release 401 obtained from a news feed service 132. This press release does not contain any direct information on whether the organization provides any prohibited products or services; however, it does mention a new product and it provides a link 402 for more information. The compliance analyzer follows link 402 to web page 403. Link 404 then leads to page 405, and link 406 leads to page 407, which identifies the business segments of a supplier of the new product. By correlating the industrial classification codes 408 and 409 of the supplier with a list of prohibited segments, the compliance analyzer concludes that the new product is in a prohibited category.

Figure 5:
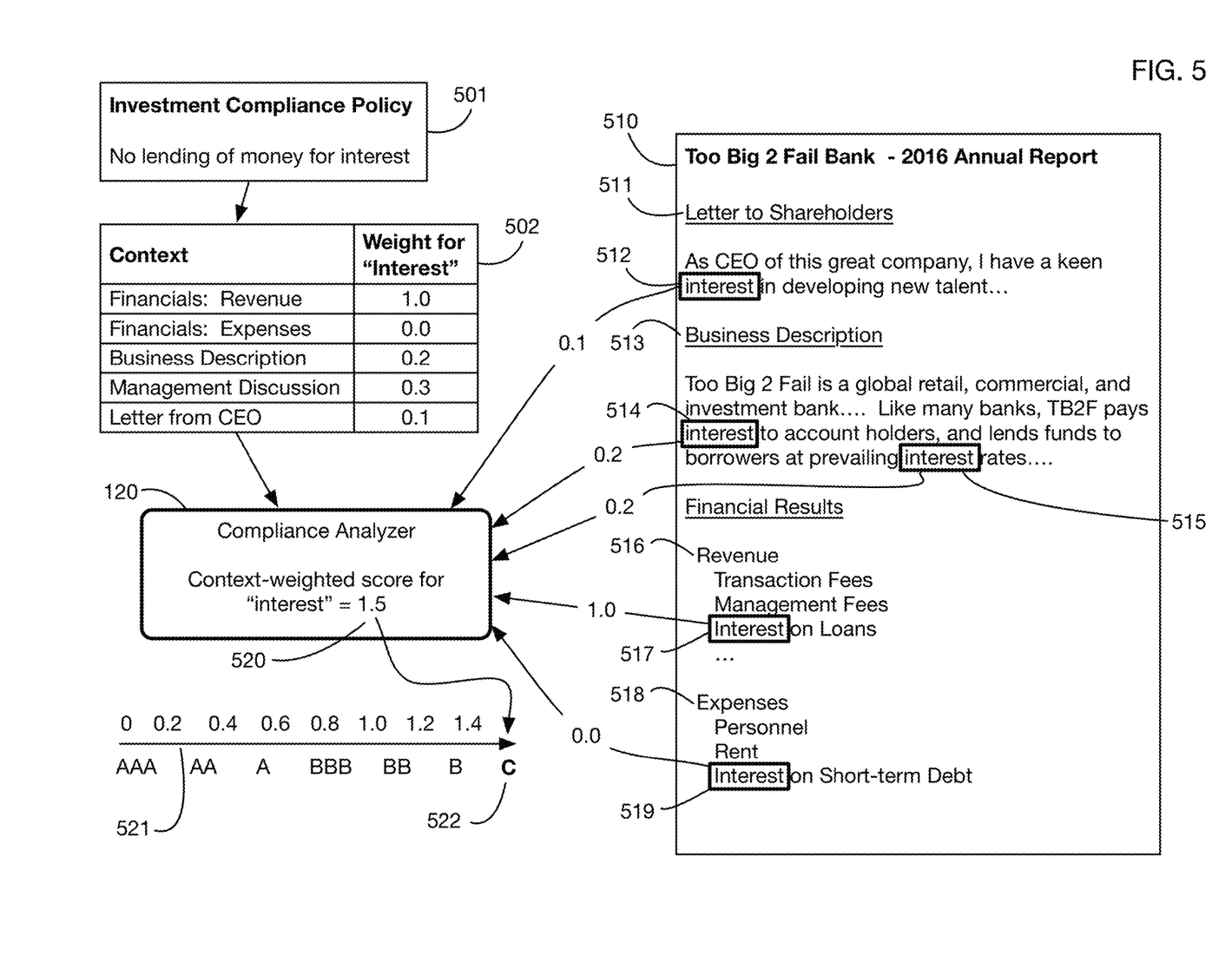
FIG. 5 illustrates an embodiment that generates a compliance score by correlating words and phrases with the context in which they appear; the context may be for example a section header of a document or a category for financial data.

In one or more embodiments, analysis of words or phrases may consider the context in which a word or phrase appears. FIG. 5 illustrates an example that analyzes data to determine compliance with a policy 501 that prohibits lending of money for interest. The compliance analyzer searches for occurrences of the term "interest" as an indicator of whether an investment violates policy 501. However, the weight assigned to this term depends on the context in which the term appears. For example, table 502 assigns various weights to the term "interest" based on a context for an annual report; the context in this situation may correspond for example to sections or subsections of a document. Annual report 510 is analyzed for occurrences of the term "interest"; each occurrence 512, 514, 515, 517, and 519 is weighted per the section 511, 513, 513, 516, and 518 respectively in which it appears. In particular, the weight for the term "interest" 519 as an expense is 0.0, since paying interest is not a violation of policy 501; however, the weight for the term "interest" 517 as revenue is high, because this is a strong indicator of violating policy 501. The compliance analyzer 120 determines an aggregate weighted score 520 for the term "interest." In this illustrative example, a transformation function 521 maps this weighted score into a categorical compliance rating for the organization to yield compliance rating 522 ("C").

Figure 6:
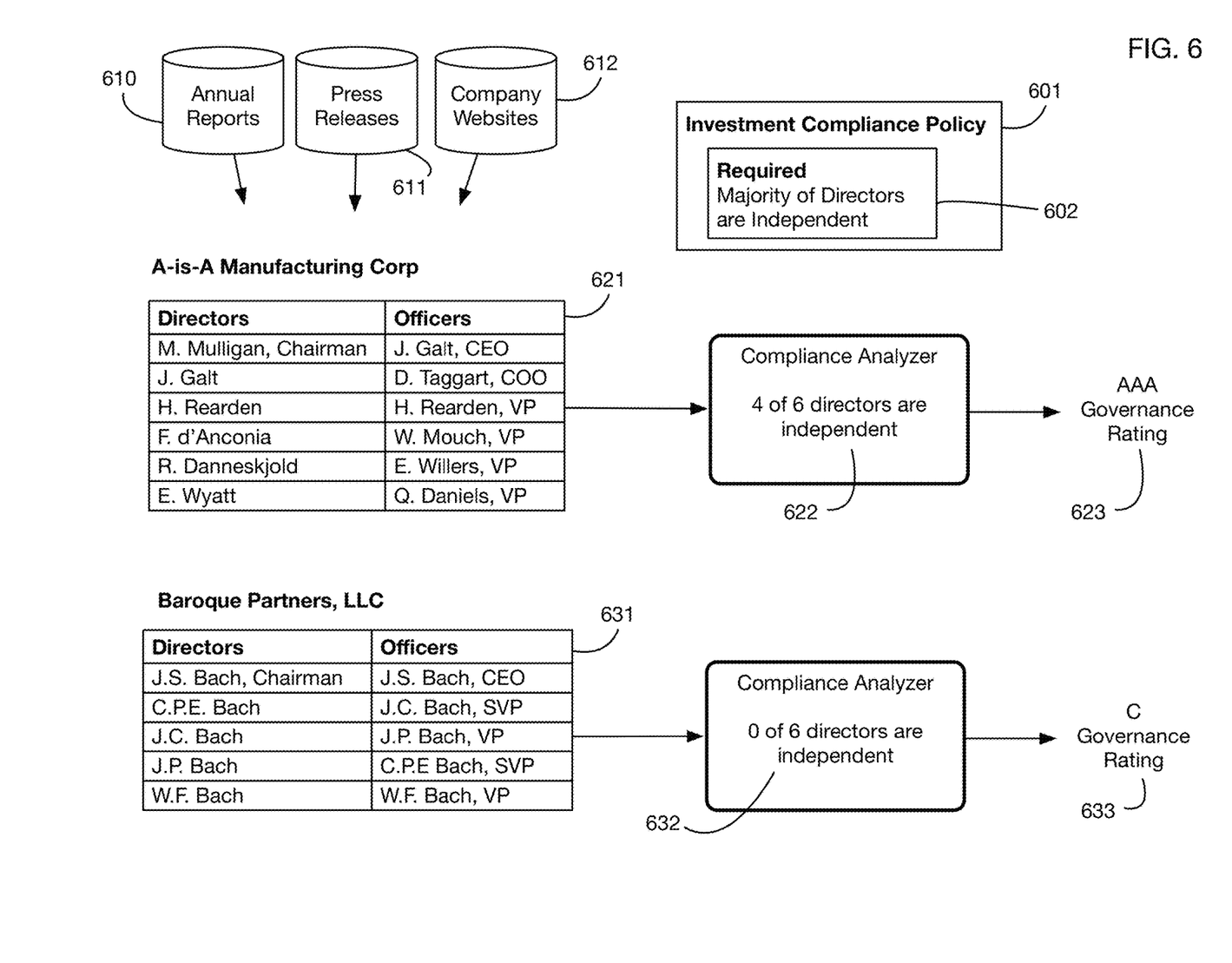
FIG. 6 illustrates an embodiment that scores compliance with a governance policy that requires independent directors.

A compliance policy may include required actions or conditions, in addition to or instead of prohibited actions or conditions. FIG. 6 illustrates an example with a policy 601 that includes a requirement 602 that addresses company governance, which requires that a majority of the directors on the board of directors be independent (non-officers). A compliance analyzer may analyze data sources such as annual reports 610, press releases 611, and company websites 612 to obtain or create lists of directors and officers; it may then compare these lists to determine compliance with policy 601. For example, list 621 of directors and officers indicates a fraction 622 of independent directors, which results in a governance compliance rating 623 for this organization; in contrast, list 631 of directors and officers shows no independent directors 632, which results in a poorer governance compliance rating 633. This example is illustrative; one or more embodiments may apply any rules or heuristics to determine compliance with any governance policy or any other compliance policy.

Figure 7:
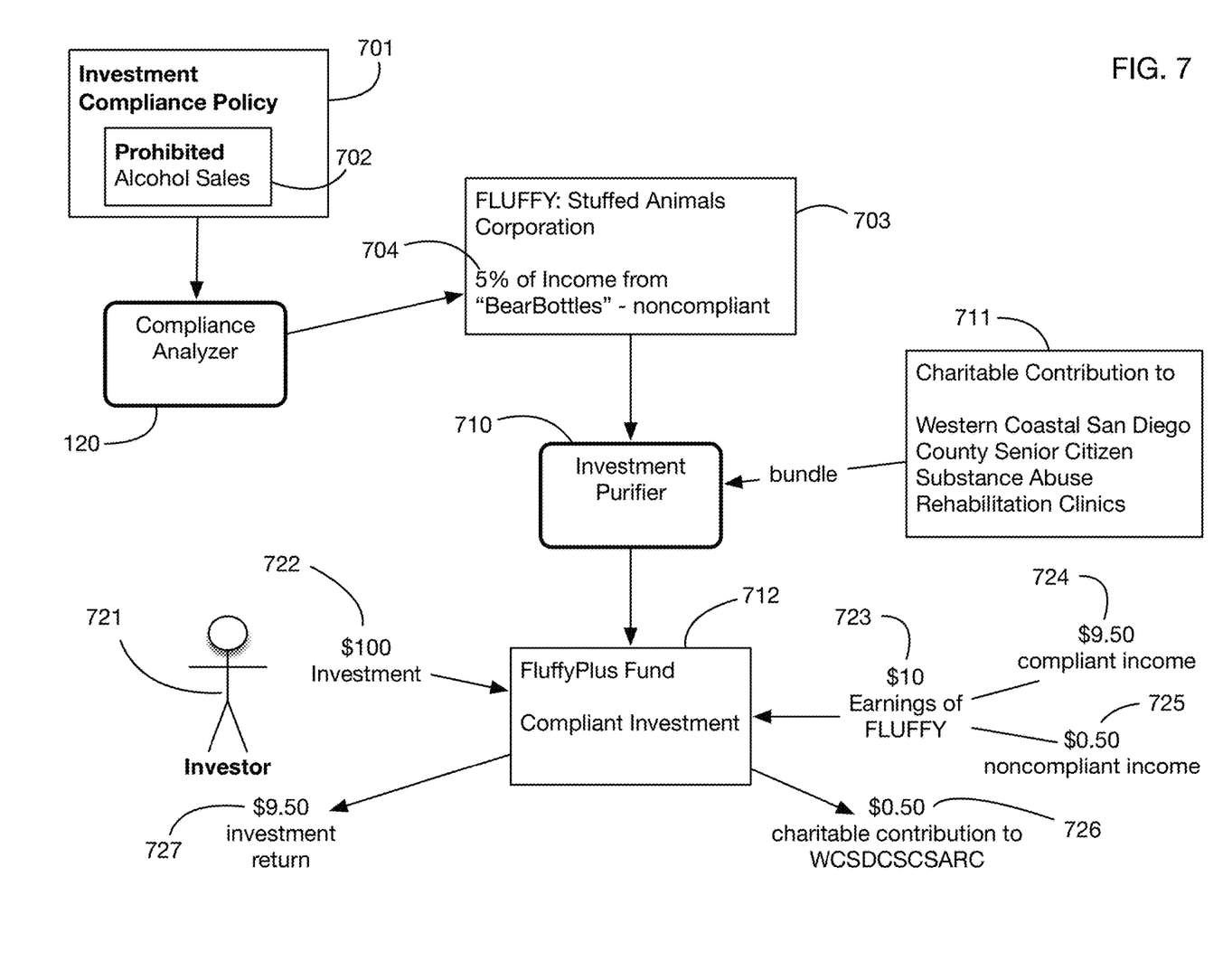
FIG. 7 illustrates an embodiment that transforms a noncompliant investment into a compliant investment by bundling a charitable contribution with the noncompliant investment.

Enforcement of a compliance policy may limit the number of investments available to potential investors. One or more embodiments may increase the pool of available investments by "purifying" an investment (or a group of investments), for example by bundling the investment with a charitable contribution that offsets noncompliant activities or conditions. FIG. 7 illustrates an example with compliance policy 701 that has a prohibition 702 against selected products. The compliance analyzer 120 determines that an investment 703 has a percentage 704 of income from the prohibited products. This investment 703 by itself is therefore not compliant, and may be unavailable to investors who require complete compliance with policy 701. The system therefore includes an investment purifier 710 that transforms this noncompliant investment 703 into a compliant investment. In this illustrative example, the purification is performed by bundling a charitable contribution 711 with investment 703, to form a compound financial instrument 712. In this example, the amount of charitable contribution is set to offset the income of the original investment 703 from the prohibited segment. For example, if investor 721 invests amount 722 into the compound investment 712, and if earnings from investment 703 during a specified time period are 723, the investment purifier may determine the amount 724 from compliant sources, and the amount 725 from noncompliant sources, and may generate, suggest, or record a charitable contribution 726 to offset the income 725 from noncompliant sources. The net earnings 727 available to investor 721 may therefore be attributed to only the compliant sources 724. One or more embodiments may bundle any number of investments with any number and type of contributions to transform noncompliant or partially compliant investments into compliant (or more compliant) investments. The amounts of contributions may be based on any factor or factors, including but not limited to the amount of income attributed to noncompliant sources. Contributions to offset noncompliant activities may be made to any organization or entity, in any form including financial contribution or contributions of goods, services, or credits.

Figure 8:
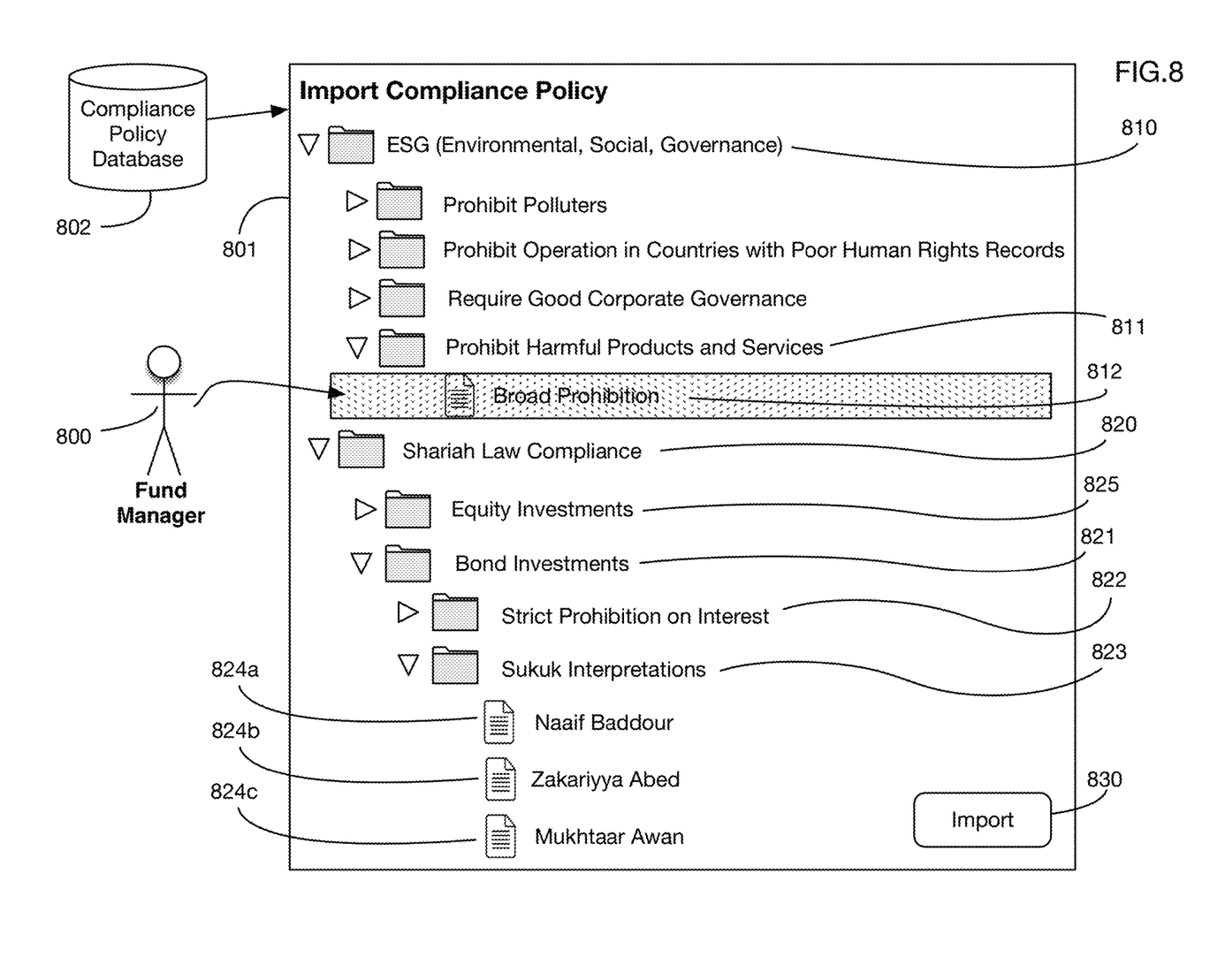
FIG. 8 illustrates a user interface that may be used by a fund manager to import compliance policies that are shared in a compliance policy database.

One or more embodiments may include components that enable fund managers or other personnel to create, edit, customize, save, or share compliance policy definitions. FIG. 8 illustrates an embodiment that provides a sharing and import capability to allow a fund manager 800 to browse compliance policy definitions that have been shared via a compliance policy database 802. For example, the database 802 may be accessible via the Internet or via a private network. User interface screen 801 provides a categorized listing of compliance policy definitions in the database. In this illustrative example, the listing includes both ESG (Environmental, Social, and Governance) policy definitions 810, and Shariah Law compliance policy definitions 820. Compliance policy definitions in database 802 may be sorted, classified, filtered, and displayed in any desired manner. In the illustrative user interface screen 801, Shariah Law Compliance policies are subdivided into policies 825 related to equity investments, and policies 821 related to bond investments. Bond policies 821 are further subdivided into policies 822 that strictly prohibit all interest, and policies 823 that allow various types of "Sukuk" bonds. Sukuk bonds provide purchasers with some type of ownership, as opposed to offering fixed interest in exchange for a loan; hence they are considered Shariah-compliant by some (but not all) Shariah scholars. Moreover, different Shariah scholars have different interpretations of Sukuk rules that make bonds compliant; hence policies 823 include several individual interpretations 824a, 824b, and 824c from different scholars. Fund manager 800 can select one or more policy definitions and import them using import button 830. For example, in FIG. 8 compliance policy definition 812 is selected; this policy definition may for example provide a broad prohibition against various products and services that may be considered "harmful."

Figure 9:
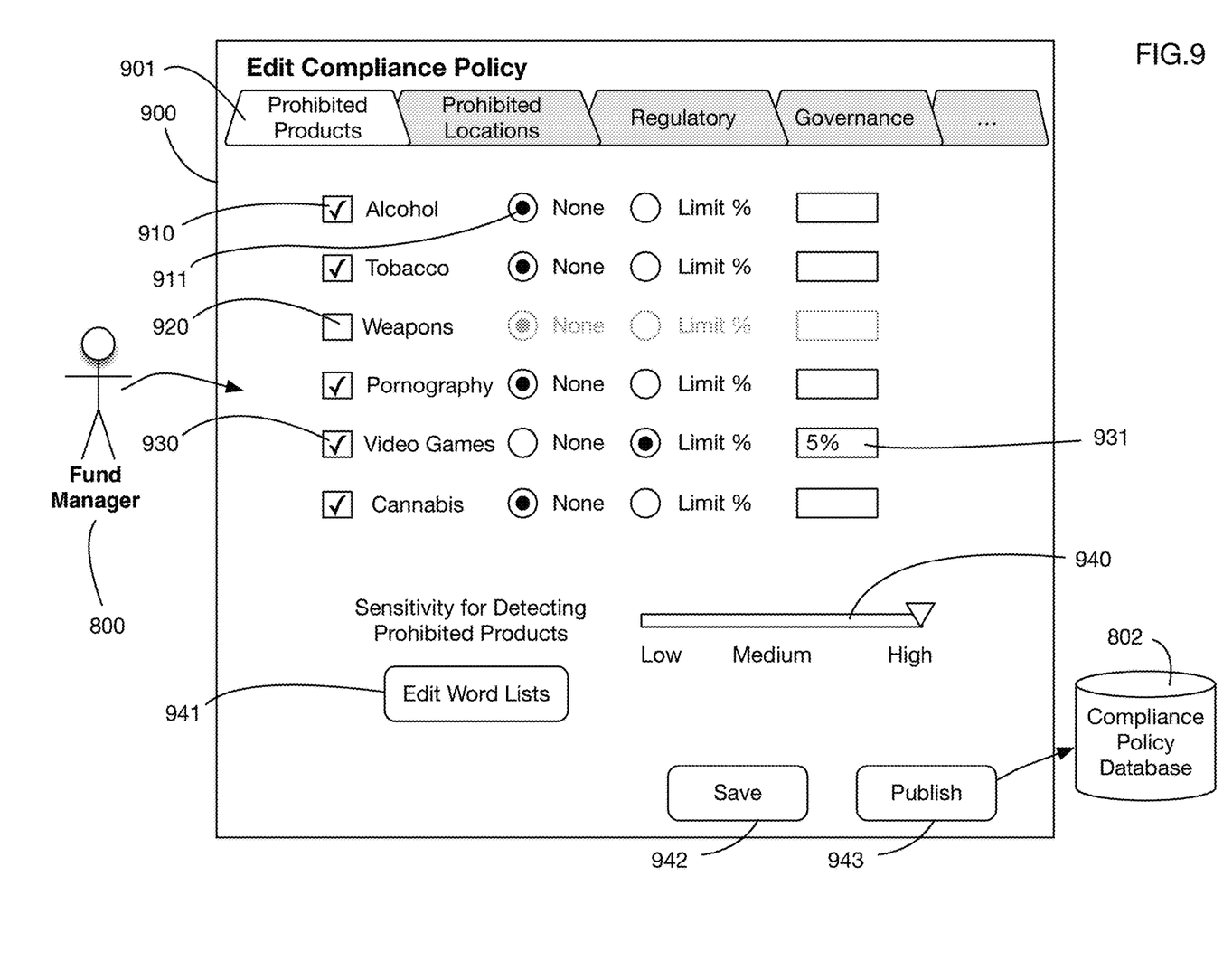
FIG. 9 illustrates a user interface that may be used to edit a compliance policy and to share it by publishing it to the compliance policy database.

In addition to or instead of an import screen, one or more embodiments may provide one or more user interface screen to allow a fund manager or other investor to create or edit one or more compliance policy definitions. For example, a fund manager may import a shared compliance policy definition to use as a starting point, and then customize this definition for the fund manager's portfolio. FIG. 9 shows an illustrative embodiment with an editing screen 900 used by fund manager 800. The compliance policy definition editing screen may for example be divided into multiple tabs or sections, including the tab 901 shown that defines prohibited products and services. This illustrative screen provides a series of checkboxes for various products and services, allowing the fund manager to determine which specific products and services should be prohibited for a particular fund or investment. For example, fund manager 800 has checked 910 to prohibit alcohol products, and has selected 911 to indicate that no sales whatsoever of alcohol products are permitted for compliant investments. The fund manager has unchecked 920 to indicate that weapons sales are not prohibited for this policy. The fund manager has selected 930 to prohibit video game sales, but has indicated that a small amount 931 of video game related activity is acceptable. In addition to the list of prohibited products and services, screen 900 provides a capability 941 to edit word and phrase lists associated with the prohibited activities, and it provides a slider 940 to control the sensitivity of a detection algorithm for prohibited activities using these words and phrases. Changes to the compliance policy definition may be saved using button 942, and the edited compliance policy definition may be shared by publishing via button 943 to the compliance policy database 802.

While the invention herein disclosed has been described by means of specific embodiments and applications thereof, numerous modifications and variations could be made thereto by those skilled in the art without departing from the scope of the invention set forth in the claims.

What is claimed is:

1. An automated compliance scoring system that analyzes network accessible data sources comprising:
   an investment compliance policy definition that defines requirements for compliant investments comprising one or more of
      one or more prohibited activities; and,
      one or more required activities,
         wherein said investment compliance policy definition comprises one or more of
            an environmental, a social or a governance compliance policy definition, and
            a Shariah law compliance policy definition;
   a list of one or more investments, each investment of said one or more investments associated with an organization; and,
   a compliance analyzer coupled to said investment compliance policy definition, to said list of one or more investments, and to one or more data sources accessible via a computer network;
   wherein said compliance analyzer comprises a computer that is configured to
      search said one or more data sources for information on each organization associated with each investment of said one or more investments;
      analyze said information for evidence to determine an extent to which each organization complies with said investment compliance policy definition, and performs one or more of said one or more prohibited activities and said one or more required activities; and,
      transform each investment of said list of one or more investments into a compliance score that measures said extent to which said organization complies with said investment compliance policy definition and performs one or more of said one or more prohibited activities and said one or more required activities to form a list of compliance scores;
   wherein said compliance analyzer is further configured to
      categorize said one or more investments by their compliance scores, and
      generate a confidence rating for each compliance score;
   a compliance policy editor tool comprising a user interface with sharing and import capability,
      wherein said compliance policy editor tool is configured to
         accept input from an investment fund manager, and,
         create or modify said investment compliance policy definition based on said input; and,
   an investment compliance policy database coupled with said computer and said compliance policy editor tool;
   wherein said user interface comprises
      a categorized listing of compliance policy definitions in said investment compliance policy database,
         wherein said categorized listing of compliance policy definitions comprises one or more of
            said environmental, social or governance compliance policy definition, subdivided into
               requirements and
               prohibitions, and said Shariah law compliance policy definition subdivided into
equity investments policies and
bond investment policies, and
one or more user interface screens;
wherein said compliance policy editor tool is further configured to
allow said investment fund manager to browse said compliance policy definitions shared via said investment compliance policy database using said one or more user interface screens,
import an external investment compliance policy from said investment compliance policy database using said one or more user interface screens,
one or more of create and edit said external investment compliance policy to form said investment compliance policy definition using said one or more user interface screens to customize said investment compliance policy definition for specific fund requirements specific to said investment fund manager, and,
publish said investment compliance policy definition that is specific to said fund manager to said investment compliance policy database using said one or more user interface screens.

2. The system of claim 1 wherein said one or more prohibited activities comprise one or more of
selling a prohibited product or service;
doing business in a prohibited location or with a prohibited entity; and,
polluting the environment.

3. The system of claim 1 wherein said one or more required activities comprise one or more of
compliance with regulations;
compliance with industry standards;
enforcement of nondiscriminatory hiring policies; and,
inclusion of outside directors in a governance structure.

4. The system of claim 2 wherein said prohibited product or service comprises one or more of alcohol, tobacco, firearms, weapons, and pornography.

5. The system of claim 1 wherein said one or more prohibited activities comprise lending of money for interest or borrowing of money for interest.

6. The system of claim 5, wherein said compliance score comprises a comparison of an amount of interest-bearing debt of said organization to one or more thresholds.

7. The system of claim 6, wherein said one or more thresholds comprise one or more of a fraction of total assets of said organization;
a fraction of liquid assets of said organization, wherein said liquid assets comprise cash and receivables;
a fraction of a market capitalization of said organization at a point in time; and,
a fraction of an average market capitalization of said organization over a period of time.

8. The system of claim 1 wherein said one or more data sources comprise one or more of organization financial reports;
filings with regulatory agencies;
news feeds;
product literature; and,
organization websites.

9. The system of claim 1 wherein said analyze said information for evidence to determine the extent to which each organization performs said one or more prohibited activities comprises calculate from said information a percentage of revenue or a percentage of income earned by said organization from said one or more prohibited activities.

10. The system of claim 1 further comprising
a database that is coupled with said computer and that associates each activity of said one or more prohibited activities with a list of words or phrases indicative of said activity;
wherein said analyze said information comprises search said information for said words or phrases.

11. The system of claim 10 further comprising a database of synonyms for said words or phrases.

12. The system of claim 10 wherein said database comprises industry classification codes.

13. The system of claim 10 wherein said analyze said information further comprises
correlate appearances of said words or phrases in said information with a context of said appearances or
crawl links that appear in said information and further analyze one or more targets of said links or
both said correlate and said crawl links.

14. The system of claim 13 wherein said context comprises a section or subsection title, wherein said compliance analyzer assigns a weight to each of said words or phrases as an indicator of whether said organization complies with said investment compliance policy, wherein each of said weights is dependent on a section or subsection title in which said words or phrases appear, and wherein said compliance analyzer determines an aggregate weighted score from each of said weights for each of said words or phrases into a categorical compliance rating for said organization to yield a compliance rating for said organization.

15. The system of claim 1 further comprising
an investment purifier coupled to said list of one or more investments and to said compliance analyzer and configured to transform at least one investment of said list of one or more investments into a compound investment that bundles a charitable contribution with said at least one investment.

16. The system of claim 15, wherein an amount of said charitable contribution is substantially equal to an amount of income earned by said at least one investment from said one or more prohibited activities.

17. The system of claim 1 wherein said one or more user interface screens comprise an import button and an editing screen.

18. The system of claim 17 wherein said editing screen comprises multiple tabs or sections and a series of checkboxes for a plurality of products and services to allow said fund manager to determine and select which products and services of said plurality of products and services should be prohibited for a particular investment of said list of one or more investments as said one or more prohibited activities via said multiple tabs or sections and said series of checkboxes.

19. The system of claim 18 wherein said editing screen further comprises
a capability tool to edit words and phrases associated with products and services determined as prohibited for said particular investment as said one or more prohibited activities,
a slider to control sensitivity of a detection algorithm for said prohibited products and services using said words and phrases,
a save button to save changes to the investment compliance policy definition, and,
a publishing button to publish said investment compliance policy definition to said investment compliance policy database.

20. An automated compliance scoring system that analyzes network accessible data sources comprising:
- an investment compliance policy definition that defines requirements for compliant investments comprising one or more of
  - one or more prohibited activities, comprising one or more of
    - selling a prohibited product or service, wherein said prohibited product or service comprises one or more of alcohol, tobacco, firearms, weapons, and pornography,
    - doing business in a prohibited location or with a prohibited entity,
    - polluting the environment,
    - lending of money for interest, and,
    - borrowing of money for interest, and,
  - one or more required activities, comprising one or more of
    - compliance with regulations,
    - compliance with industry standards,
    - enforcement of nondiscriminatory hiring policies, and,
    - inclusion of outside directors in a governance structure,
    - wherein said investment compliance policy definition comprises one or more of
      - an environmental, a social or a governance compliance policy definition, and
      - a Shariah law compliance policy definition;
- a list of one or more investments, each investment of said one or more investments associated with an organization; and,
- a compliance analyzer coupled to said investment compliance policy definition, to said list of one or more investments, and to one or more data sources accessible via a computer network;
- wherein said one or more data sources comprise one or more of
  - organization financial reports;
  - filings with regulatory agencies;
  - news feeds;
  - product literature; and,
  - organization websites;
- wherein said compliance analyzer comprises a computer that is configured to
  - search said one or more data sources for information on each organization associated with each investment of said one or more investments;
  - analyze said information for evidence to determine an extent to which each organization complies with said investment compliance policy and
    - performs said one or more of one or more prohibited activities and said one or more required activities; and,
  - transform each investment of said list of one or more investments into a compliance score that measures said extent to which said organization complies with said investment compliance policy definition and performs one or more of said one or more prohibited activities and said one or more required activities to form a list of compliance scores;
- an investment purifier coupled to said list of one or more investments and to said compliance analyzer and configured to transform at least one investment of said list of one or more investments into a compound investment that bundles a charitable contribution with said at least one investment, wherein said charitable contribution equals an amount of income earned by said at least one investment from said one or more prohibited activities;
- a compliance policy editor tool comprising a user interface with sharing and import capability, wherein said compliance policy editor tool is configured to
  - accept input from an investment fund manager, and,
  - create or modify said investment compliance policy definition based on said input; and,
- an investment compliance policy database coupled with said computer and said compliance policy editor tool;
- wherein said user interface comprises
  - a categorized listing of compliance policy definitions in said investment compliance policy database,
    - wherein said categorized listing of compliance policy definitions comprises one or more of
      - said environmental, social or governance compliance policy definition, subdivided into
        - requirements and
        - prohibitions, and
      - said Shariah law compliance policy definition subdivided into
        - equity investments policies and
        - bond investment policies, and
  - one or more user interface screens;
- wherein said compliance policy editor tool is further configured to
  - allow said investment fund manager to browse said compliance policy definitions shared via said investment compliance policy database using said one or more user interface screens,
  - import an external investment compliance policy from said investment compliance policy database using said one or more user interface screens,
  - one or more of create and edit said external investment compliance policy to form said investment compliance policy definition using said one or more user interface screens to customize said investment compliance policy definition for specific fund requirements specific to said investment fund manager, and,
  - publish said investment compliance policy definition that is specific to said fund manager to said investment compliance policy database using said one or more user interface screens.

* * * * *